US012523972B2

(12) United States Patent
Roberts et al.

(10) Patent No.: US 12,523,972 B2
(45) Date of Patent: Jan. 13, 2026

(54) EVENT ENGINE FOR BUILDING MANAGEMENT SYSTEM USING DISTRIBUTED DEVICES AND BLOCKCHAIN LEDGER (71) Applicant: Tyco Fire & Security GmbH, Neuhausen am Rheinfall (CH)

(72) Inventors: Matthew Roberts, North Chelmsford, MA (US); Miguel Galvez, Plaistow, NH (US); Stephen Tarmey, Leominster, MA (US); Ashwin Reddy Lingannagari, Billerica, MA (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 16/112,030

(22) Filed: Aug. 24, 2018

(65) Prior Publication Data
US 2020/0064792 A1 Feb. 27, 2020

(51) Int. Cl.
G05B 15/02 (2006.01)
(52) U.S. Cl.
CPC .................................... G05B 15/02 (2013.01)
(58) Field of Classification Search
CPC ............................ G05B 15/02; G06F 16/1834
See application file for complete search history.

(56) References Cited

U.S. PATENT DOCUMENTS

| 10,116,513 B1 * | 10/2018 | Sundaram | H04L 12/2816 |
| 10,142,122 B1 * | 11/2018 | Hill | H04L 12/2807 |
| 10,616,324 B1 * | 4/2020 | Kaddoura | A61F 2/4455 |
| 10,878,482 B2 * | 12/2020 | Chapman | G06F 16/9535 |
| 11,108,627 B2 * | 8/2021 | Smith | H04L 67/12 |
| 11,231,920 B2 * | 1/2022 | Taivalsaari | G06F 8/65 |
| 2014/0244768 A1 * | 8/2014 | Shuman | H04W 4/70 709/206 |
| 2014/0285313 A1 * | 9/2014 | Luna | G08C 17/02 340/4.42 |
| 2014/0316561 A1 | 10/2014 | Tkachenko et al. | |
| 2016/0123620 A1 * | 5/2016 | Orsini | G05B 19/048 700/276 |
| 2017/0018167 A1 | 1/2017 | Dey et al. | |

(Continued)

FOREIGN PATENT DOCUMENTS

WO  WO-2019213781 A1 * 11/2019 ......... H04L 67/1044
WO  WO 2019216942    11/2019

Primary Examiner — Robert E Fennema
Assistant Examiner — Vi N Tran
(74) Attorney, Agent, or Firm — ArentFox Schiff LLP (57) ABSTRACT A distributed event engine for controlling distributed devices of a building management system executes as discrete event processes on distributed devices with sufficient computing power and availability. The distributed devices communicate via a peer-to-peer network and a distributed ledger (e.g. blockchain). An event engine configuration module assigns the event processes to the distributed devices based on device and capability information published to the distributed ledger. An edge device scoring process executing on the distributed devices executing the event processes determines which other distributed devices to control based on which devices are compatible with local event processes and/or electrically and geographically close, resulting in decreased latency, vulnerability to hacking and corruption of data.

24 Claims, 4 Drawing Sheets (56) References Cited

U.S. PATENT DOCUMENTS

| | | | |
|---|---|---|---|
| 2017/0099157 A1* | 4/2017 | Jacobson | H04W 12/50 |
| 2017/0103468 A1 | 4/2017 | Orsini et al. | |
| 2017/0195336 A1 | 7/2017 | Ouellette | |
| 2018/0102007 A1 | 4/2018 | Trani | |
| 2018/0121662 A1 | 5/2018 | Pelton | |
| 2018/0197172 A1 | 7/2018 | Coburn et al. | |
| 2018/0285837 A1 | 10/2018 | Wu | |
| 2018/0328612 A1* | 11/2018 | Sinha | F24F 11/30 |
| 2018/0332065 A1* | 11/2018 | Gupta | H04W 12/08 |
| 2019/0012637 A1 | 1/2019 | Gillen | |
| 2019/0020648 A1 | 1/2019 | Haque | |
| 2019/0036906 A1 | 1/2019 | Biyani et al. | |
| 2019/0052722 A1* | 2/2019 | Gasking | G06Q 10/101 |
| 2019/0090090 A1* | 3/2019 | Doyal | G06Q 20/3224 |
| 2019/0268162 A1 | 8/2019 | Sahagun et al. | |
| 2019/0287146 A1* | 9/2019 | Maitland | G06Q 30/04 |
| 2019/0342095 A1 | 11/2019 | Simons | |
| 2019/0361917 A1 | 11/2019 | Tran et al. | |
| 2019/0373472 A1 | 12/2019 | Smith et al. | |
| 2019/0378142 A1 | 12/2019 | Darnell et al. | |
| 2020/0059365 A1 | 2/2020 | Hyland | |
| 2020/0106610 A1 | 4/2020 | Doddavula et al. | |
| 2020/0195442 A1 | 6/2020 | Wright et al. | |
| 2020/0234386 A1 | 7/2020 | Blackman et al. | |
| 2020/0287719 A1 | 9/2020 | Hildebrand et al. | |
| 2021/0011710 A1* | 1/2021 | Taivalsaari | G06F 8/65 |
| 2021/0233672 A1* | 7/2021 | Patil | H04W 4/70 |

\* cited by examiner

EVENT ENGINE FOR BUILDING MANAGEMENT SYSTEM USING DISTRIBUTED DEVICES AND BLOCKCHAIN LEDGER

RELATED APPLICATIONS

This application is related to U.S. application Ser. No. 16/111,998, filed on Aug. 24, 2018, entitled "Building Management System with Blockchain Ledger," and U.S. application Ser. No. 16/112,041, filed on Aug. 24, 2018, entitled "Access Control System Using Blockchain Ledger," both of which are incorporated herein by reference in their entirety.

BACKGROUND OF THE INVENTION

Building management systems such as intrusion system and access control systems are often installed within premises such as commercial, residential, or governmental buildings. Examples of these buildings include offices, hospitals, warehouses, public infrastructure buildings including subways and bus terminals, multi-unit dwellings, schools or universities, shopping malls, government offices, and casinos.

In general, building management systems include one or more control panels or controllers connected to and controlling distributed devices, which perform the building management functions of the building management system. The controllers and distributed devices communicate via wired and/or wireless networks supporting digital and/or analog communication between the devices.

Intrusion systems typically include intrusion control panels and distributed devices. The distributed devices detect indications of intrusions, building security breaches and unauthorized access at or within the building and report to the intrusion panels. Intrusion distributed devices include sensors such as motion sensors, door and window relays, thermal sensors, and surveillance cameras that communicate with the intrusion panel over a security network. Motion sensor devices can detect intrusions and unauthorized access to the premises, and send indications of the intrusions to the intrusion panel. The surveillance camera devices capture video data of monitored areas within the premises, in examples.

Access control systems typically include control panels such as system controllers and door controllers, and distributed devices, including door position sensors, access control readers, and actuators like electric door locks, to list a few examples. The access control readers are often installed at access points of the buildings to control access to restricted areas, such as buildings or areas of the buildings. Examples of access points include front and interior doors of a building, elevators, hallways connecting two areas of a building. The access control readers read the information of keycards and/or transmitted from mobile computing devices and then the access control systems determine if the individuals are authorized to access the restricted areas. If the individuals are authorized to enter the restricted areas, then the access control readers allow access to the restricted areas by unlocking locked doors, signaling that doors should be unlocked, and activating elevators. Alarms can be generated upon unauthorized entry.

At the same time, distributed ledgers are decentralized data storage systems in which multiple instances of the same data are stored as local ledger copies on nodes of a peer to peer network. The distributed ledger indicates information through a series of transactions, which are validated by the nodes, for example, by confirming that the transactions are compatible with the transaction history indicated by the local ledger copy. Validated transactions are propagated across the network as new ledger entries, and the local ledger copies are synchronized according to consensus algorithms that determine an authoritative version of the ledger based on consensus criteria, which can include which nodes were first to solve a cryptographic puzzle, a chance selection weighted such that nodes representing entities with more ownership stake in the ledger have a higher chance of selection, voting systems, among other examples. One type of distributed ledger is a blockchain. In a blockchain, the transactions are organized into blocks, which are then validated and propagated across the peer to peer network. Along with the transaction information, each block contains a cryptographic hash of the full contents of the previous block, forming chains of linked blocks that can be traced back to the original block of the blockchain. Blockchains prevent alteration of any of the blocks, as any change to a block would require changes to the cryptographic hashes contained in every subsequent block.

SUMMARY OF THE INVENTION

Often, the controllers of the building management systems are located at a central location in the building closer to a core of the network, while the distributed devices are positioned throughout the building closer to edges of the network where the devices of the network interact with the building's environment and/or occupants. Thus, the controllers are not necessarily located close to the distributed devices that they are controlling. This distance between the controllers and the distributed devices can cause problems such as latency and vulnerability to hacking and/or data corruption.

These problems can be mitigated through the use of a distributed controller architecture. A building management system event engine (for example, a user verification process of an access controller) is distributed across the network among the distributed devices having sufficient computing and storage capabilities and which are physically and electronically close to the devices being controlled by the event engine. Portions of the event engine execute as smaller event processes on various distributed devices, resulting in decreased latency due to limited communication hops between the collective event engine and the devices being controlled by it.

In one example, rather than door readers sending access credential information to the centrally located (but possibly not geographically or electronically closely located) access controller (which could mean transiting many routers and switches), the information is transmitted locally to the distributed devices running the event engine. Since the devices are closely located, this achieves a very low level of latency in the transmission of the data and in the overall access control decision process. Moreover, as more distributed devices are added to the building management system, the speed at which the event engine can run improves, as each additional device represents additional processing and memory capacity for further distributing and running the event processes of the event engine. This provides a method of distributing event engine processing while maintaining the highest possible level of system performance and security.

The devices executing the distributed event engine need to be able to communicate in a highly secure way, with each node being able to trust that the others have performed their part of the processing efficiently, accurately and securely. Therefore, the distributed event engine includes an event engine configuration module that approves the various distributed devices to run the event processes of the event engine. The event engine configuration module makes sure that the devices are capable, for example, by implementing each device as an entry of a distributed ledger (e.g. block of a block chain) of the building management system. The distributed devices advertise device and capability information such as their computing power, memory capacity, availability (how much of its processing is available and can be dedicated to the event engine), and electrical and physical location with respect to the devices that are to be controlled. The event engine configuration module then assigns or approves use of the distributed devices to execute portions of the event engine based on the device and capability information.

Additionally, an edge device scoring process executing on the distributed devices weights the different characteristics of the distributed devices being controlled based on the device and capability information in order to determine which distributed devices to retrieve data from and send sensor data to (e.g. via the distributed ledger). In one example, distributed device implementation includes embedded algorithms that can be utilized for generating these types of scores.

In this manner, the distributed portions of the event engine will collectively be located as proximately as possible to the eventual controlled device and to the ultimate action being taken, thereby reducing latency and improving overall system performance.

In general, according to one aspect, the invention features a method of operation of a building management system. Distributed devices of the building management system publish device and capability information to a distributed transaction ledger. The distributed devices are configured with event engine process instructions based on the device and capability information and perform peripheral functions of the building management system and control other distributed devices based on the event engine process instructions and transaction information from the transaction ledger.

In embodiments, the distributed transaction ledger is a blockchain. The device and capability information includes device type, device functionality, electrical and/or geographic location information, computing power, memory and/or processor availability. Control-capable devices and secondary devices are identified among the distributed devices based on this device and capability information, wherein only the control capable devices are configured with the event engine process instructions, and they control the other devices. The distributed devices are configured with the event engine process instructions based on types and functionalities of nearby distributed devices and determine which other distributed devices to control based on the device and capability information and the transaction information published by the other distributed devices, whether local event engine process instructions are compatible with functionalities of the other distributed devices, and/or electrical and/or geographic proximity information. The distributed devices generate and publish the transaction information (e.g. status information, sensor data, signal data, and/or instructions for the distributed devices to perform different actions) to the distributed ledger during normal operation of the building management system.

In general, according to another aspect, the invention features, a building management system comprising distributed devices and an event engine configuration module. The distributed devices perform peripheral functions of the building management system and publish device and capability information to a distributed transaction ledger. The event engine configuration module configures the distributed devices with event engine process instructions based on the device and capability information. The distributed devices control other distributed devices based on the event engine process instructions and transaction information from the transaction ledger.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE
PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
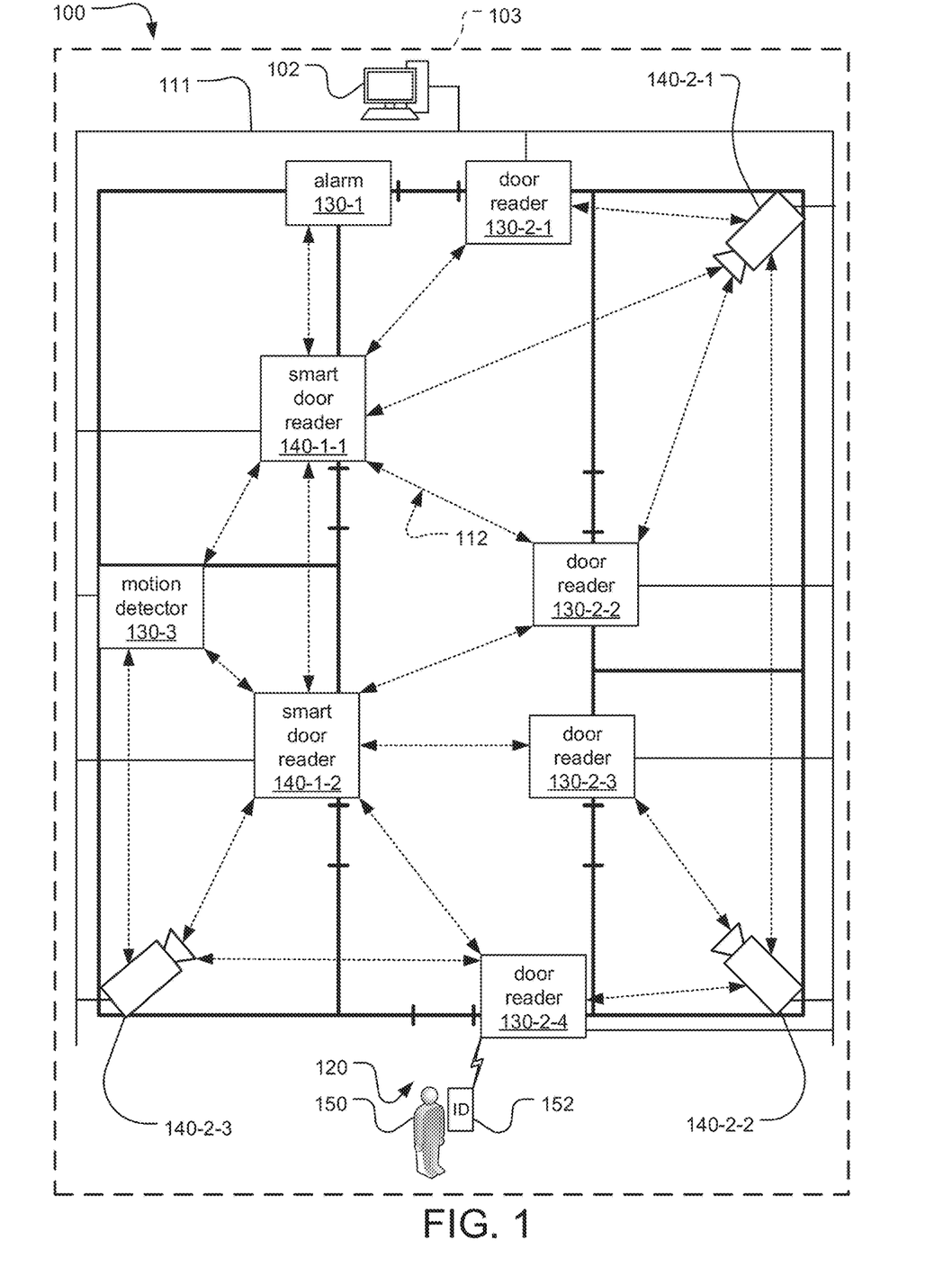
FIG. 1 is a schematic diagram of a building management system, according to an embodiment of the present invention.

FIG. 1 is a schematic diagram of a building management system 100, according to an embodiment of the present invention.

The building management system 100 is installed at a premises such as a building 103 (e.g. office, hospital, warehouse, retail establishment, shopping mall, school, multi-unit dwelling, government building, or casino) and controls and monitors various equipment and conditions throughout the building 103.

The building management system 100 includes a series of distributed devices 130, 140. The distributed devices 130, 140 are positioned throughout the building 103 and perform the peripheral management and/or automation functions of the building management system 100. These devices might function as sensors, user interface elements, and/or actuators, among other examples. Of these, the sensors detect environmental conditions of the building 103 and send sensor data to be used by the controllers. The user interface elements present information to occupants of the building 103 and/or receive user input (e.g. via touchscreen displays or card readers). The actuators effect changes throughout the building 103 in order to, for example, control the building equipment and environmental conditions. Some distributed devices 130, 140 combine functionality of sensors, user interface elements and actuators in one device.

The distributed devices 130, 140 of the building management system 100 are connected to a building management network 111 of the building 103. The building management network 111 supports wired and/or wireless digital and/or analog communication between the distributed devices 130, 140 and possibly other devices including control panels or controllers of the building management system 100. In some embodiments, the distributed devices 130, 140 from multiple different building management systems 100 could all be connected to the same building management network 111 having common address spaces allowing the devices to communicate with each other. The building management network 111 might also be connected to other networks such as a private network built for specific enterprise clients and/or a public network such as the internet, in examples. The distributed devices 130, 140 are edge devices of the network, interacting directly with occupants 150 and/or an environment of the building 103.

In general, the distributed devices 130, 140 are controlled by a distributed event engine. The distributed event engine is a series of event processes and/or applications executing on different control-capable distributed devices 140, which have, for example, sufficient processing capability and/or memory capacity for executing the event processes in addition to performing the respective peripheral building management functions of the devices. For example, the control-capable distributed devices 140, via the event processes, might receive and process sensor data from and/or send instructions to basic distributed devices 130, which are devices that solely perform their respective peripheral building management functions without executing portions of the distributed event engine. In this way, the event processes executing on the control-capable distributed devices 140 collectively direct the overall functionality of the building management system 100.

To this end, the distributed devices 130, 140 communicate with each other via the building management network 111 and a peer-to-peer network 112, which is, for example, a virtual or overlay network in which the distributed devices 130, 140 communicate directly with other distributed devices 130, 140, for example, without relying on a centralized server.

Additionally, the distributed devices 130, 140 maintain a distributed transaction ledger for storing system data and/or communicating with each other. The distributed devices 130, 140 generate transaction information during normal operation of the building management system 100. The transaction information can include status information including status changes related to building management events, historical status and event information, authorization information (e.g. information about which devices are authorized to store and retrieve transaction information or perform particular building management functions), configuration information, and/or instructions for other distributed devices 130, 140, among other examples. The distributed devices 130, 140 broadcast the transaction information to a validation network. Nodes of the validation network such as the control-capable distributed devices 140 of the peer-to-peer network 112 maintain the distributed transaction ledger (e.g. a blockchain) for the building management system 100, for example, by validating the transaction information and distributing the transaction information across the validation network according to consensus criteria to be stored locally in multiple instances by each node. The validation network can be a publicly accessible distributed ledger such as a public blockchain, or it can be privately administered, with access restricted to only authorized nodes and/or distributed devices 130, 140.

The control-capable distributed devices 140 access the distributed transaction ledger via local stored copies of the ledger, while the basic distributed devices 130 access the ledger, for example, by sending queries to control-capable distributed devices 140. The distributed devices 130, 140 perform the building management functions based on the transaction information (e.g. instructions) retrieved from the distributed transaction ledger and/or in response to direct instructions from the control-capable distributed devices 140.

The building management system 100 might also include one or more control panels, controllers, central servers, and/or other building management system control and configuration devices 102 that are also capable of directing some aspects of the functionality of the building management system 100 in parallel with the distributed event engine. In different examples, the control and configuration device 102 performs an initial configuration of the building management system 100, for example, by posting device authorization information to the transaction ledger indicating which distributed devices 130, 140 are authorized to access the ledger, assigns basic distributed devices 130 to be controlled by control-capable distributed devices 140, and/or provides a user interface for configuring the building management system 100.

In the illustrated example, the building management system 100 includes a combination of an intrusion system and an access control system.

The intrusion system detects indications of intrusions, security breaches and unauthorized access at or within the building 103 and alerts managers and/or occupants 150 of the building 103, and provides video surveillance of the building 103. Control-capable distributed devices 140 of the intrusion system include surveillance cameras 140-2 as well as other devices (not illustrated) such as network video recorders. Basic distributed devices 130 of the intrusion system include motion detectors 130-3 and alarm annunciators 130-1 as well as other devices (not illustrated) such as door and window relays. The surveillance cameras 140-2 capture image data depicting areas of the building 103, which is monitored, stored by the network video recorder and/or analyzed, for example, via event processes (e.g. for video analytics and facial recognition) executing on the control-capable distributed devices 140. The motion detectors 130-3 detect the presence of individuals in proximity, for example, and, in response, send signals to the control-capable distributed devices 140. The alarm annunciators 130-1 provide audible or visual alerts (e.g. alarm bells or sirens) in response to instructions from the control-capable distributed devices 140.

The access control system controls access through access points 120 (e.g. doors, elevators) to restricted areas of the building 103. Access control devices include basic door readers 130-2, and control-capable "smart" door readers 140-1. The door readers 130-2 and smart door readers 140-1 receive input (e.g. identification information) from occupants 150 of the building 103 seeking access through the access points 120 to the restricted areas. The basic door readers 130-2 send the identification information to control-capable distributed devices 140 for verification. On the other hand, the smart door readers 140-1 might send the identification information to be verified by other devices or verify the identification information locally (e.g. based on authorization information from the transaction ledger, which might include a list of users authorized to enter restricted areas), depending on which specific event processes are executing on the smart door readers 140-1. Upon verification of the identification information and in response to instructions from the control-capable distributed devices 140, access is granted or denied, for example, via door strikes unlocking the door.

The transaction information stored on the transaction ledger for an intrusion and/or access control system might include status information including status changes for the distributed devices 130, 140 and/or the system as a whole (such as whether the intrusion system is armed or unarmed, whether and when intrusion was detected, whether access points 120 are locked or unlocked, or access control events indicating identification information and access point information for each time an access point 120 is engaged with by an occupant 150, and whether access was granted or denied), instructions sent from the control-capable distributed devices 140 to the basic distributed devices 130, schedule information indicating when the system should be armed or unarmed, user input information, user authorization information indicating which occupants 150 are authorized to access different areas of the building 103 and which ID badges 152 are associated with the occupants 150, user input information, configuration information and/or device authorization information indicating which distributed devices 130, 140 are authorized to access the distributed ledger. The transaction information also includes time and date information. In this way, the distributed transaction ledger includes a log of intrusion and access control events and historical configuration information and user authorization information, which are permanently added to the ledger in real time and can be accessed by the distributed devices 130, 140, technicians and/or security personnel.

Figure 2:
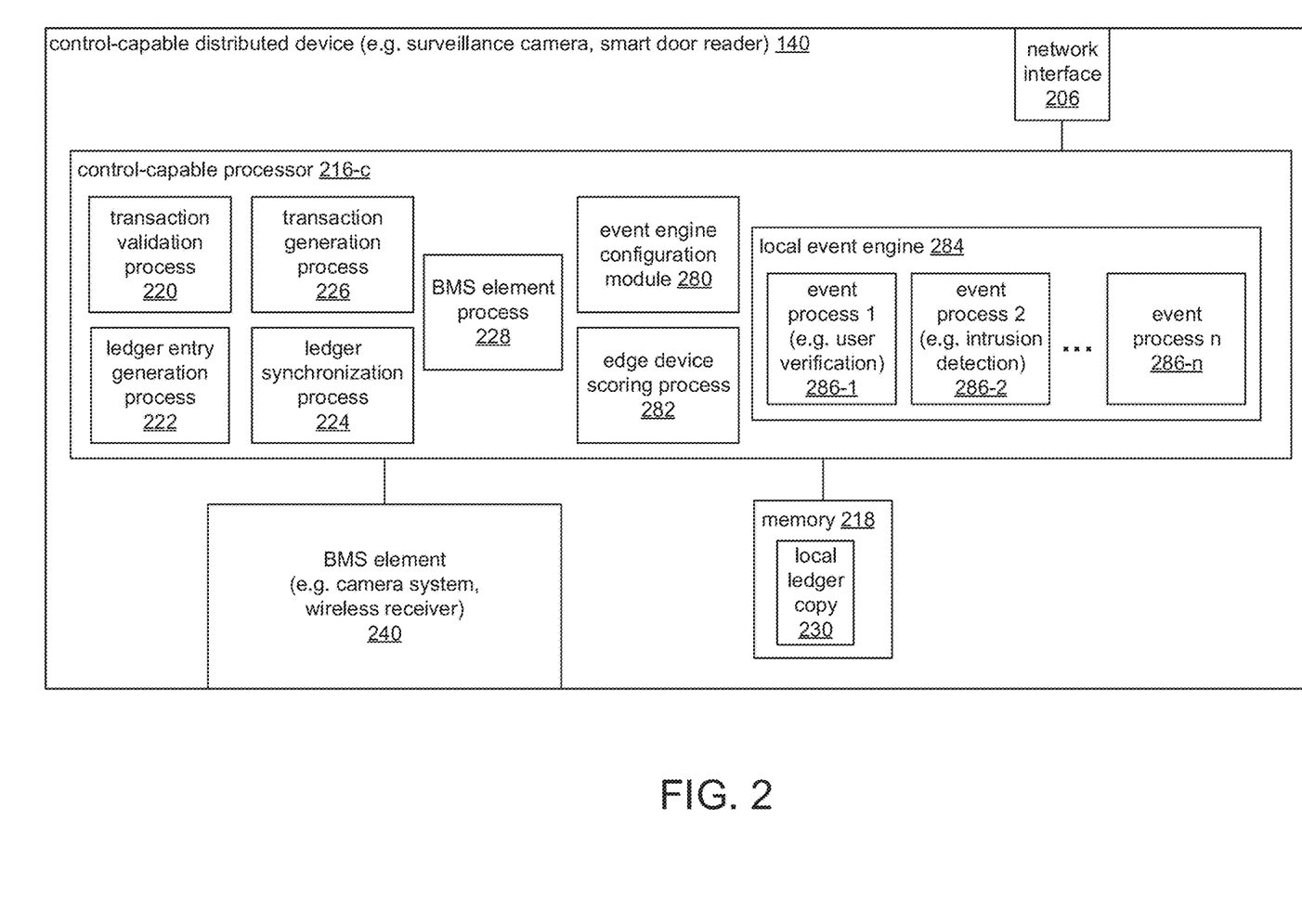
FIG. 2 is a schematic diagram of an exemplary control-capable distributed device of the building management system.
Figure 3:
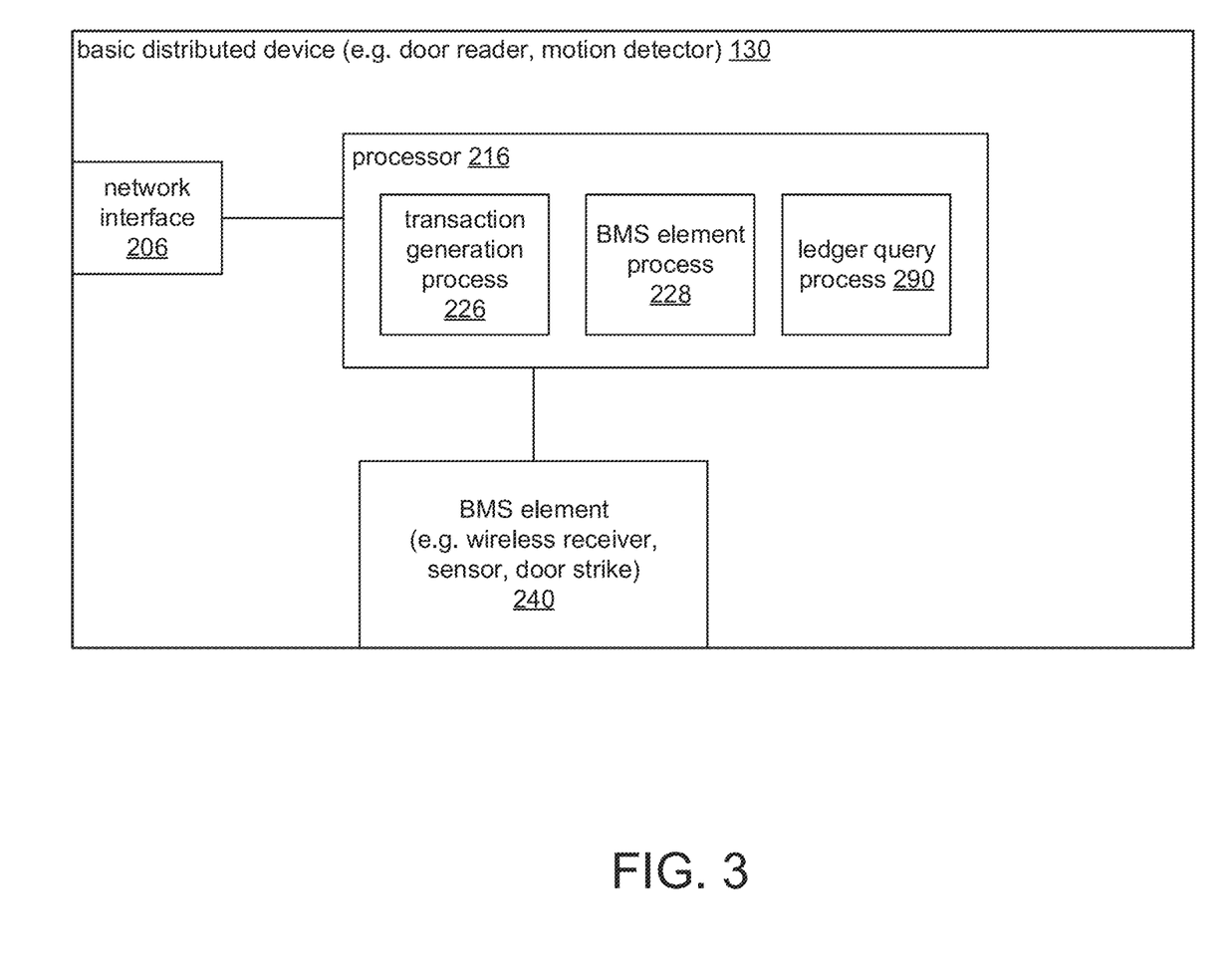
FIG. 3 is a schematic diagram of an exemplary basic distributed device of the building management system.

In general, FIGS. 2 and 3 are schematic diagrams of the distributed devices 130, 140, which perform the peripheral building management functions of the building management system 100.

All of the distributed devices 130, 140 similarly include a processor 216, a network interface 206, and a building management system (BMS) element 240. The devices 130, 140 connect to the building management network 111 via the network interface 206, which can provide wired and/or wireless connections. The BMS element 240 is, generally, a mechanism for performing the peripheral building management functions of the building management system 100. The BMS element 240 can include sensors (e.g. temperature and humidity sensors, motion sensors, and/or cameras for capturing image data), actuators (e.g. components for opening or closing blinds, lowering projector screens, controlling climate conditions, illuminating areas of the building 103, and/or locking or unlocking doors), and user interface elements (e.g. touchscreen displays, speakers, microphones, indicators, annunciators). The processor 216 executes firmware instructions along with a particular BMS element process 228 for directing the functionality of the device and the BMS element 240 along with a transaction generation process 226, which generates the transaction information during normal operation of the device (e.g. based on status changes and/or intrusion and access control events).

More specifically, FIG. 2 is a schematic diagram of an exemplary control-capable distributed device 140.

As previously described, the control-capable distributed device 140 includes the network interface 206, the BMS element 240, and the processor 216, which executes the BMS element process 228 and the transaction generation process 226. Now, however, the control capable distributed device 140 includes nonvolatile memory 218 for storing a local copy of the distributed transaction ledger 230, and the processer 216 is specifically a control-capable processor 216-c, which is a processor with sufficient processing capability for execute portions of the distributed event engine in addition to the processes associated with maintaining the distributed transaction ledger and the BMS element process 228.

Executing on the control-capable processor 216-c is a transaction validation process 220, a ledger entry generation process 222, a ledger synchronization process 224, an event engine configuration module 280, an edge device scoring process 282, and a local event engine 284 comprising a series of discrete event processes 286.

In general, the transaction validation process 220, ledger entry generation process 222, and ledger synchronization process 224 perform the functions related to maintaining the distributed transaction ledger. The transaction validation process 220 validates the transaction information from the distributed devices 130, 140 (e.g. by confirming, based on the transaction ledger, that the distributed device 130, 140 that generated the transaction information was authorized to post to the ledger, among other examples). The ledger entry generation process 222 generates a new entry for the ledger (e.g. a new block in a blockchain) based on the transaction information. In one example, the new entry is generated based on a predetermined proof-of-work process (e.g. appending a random number to the end of the block until a hash of the block meets predefined criteria), or alternatively, based on a proof-of-stake process. The ledger synchronization process 224 validates incoming new ledger entries and adds them to the local ledger copy 230 and also determines which version of the local ledger copy 230 is authoritative based on predetermined consensus criteria (such as a scoring process for new blockchains to determine the longest chain, for example).

The event engine configuration module 280 retrieves device and capability information for the distributed devices 130, 140 from the local ledger copy 230, generates event engine assignment information indicating which portions of the distributed event engine should execute on which control-capable edge devices 140, and configures the control-capable edge devices 140 with the event engine process instructions (e.g. applications for performing the control functions of the event engine). In an alternative example (not illustrated), the event engine configuration module executes on the control and configuration device 102 of the building management system 100.

The edge device scoring process 282 retrieves transaction information and device and capability information from the local ledger copy 230, scores the different devices based on a predetermined scoring algorithm, and determines which transactions from the ledger should be processed by the control-capable distributed device 140 via the event processes 286 of the local event engine 284. In one example, the edge device scoring process 282 determines which distributed devices 130, 140 are compatible with the local event processes 286 executing on the control-capable distributed device 140 and further determines which distributed devices 130, 140 are electrically or geographically near the control-capable distributed device 140.

The local event engine 284 comprises a variable number of event processes 286, each of which performs a control function of the building management system 100 based on the transaction information published to the ledger by the distributed devices 130, 140. The event processes 286 could include a user verification process 286-1 for verifying user credentials received by a door reader 130-2, or an intrusion detection process 286-2 for processing sensor data received by a motion detector 130-3, among other examples.

FIG. 3 is a schematic diagram showing an exemplary basic distributed device 130. As previously described, the basic distributed device 130 includes the network interface 206, the BMS element 240 and the processor 216 executing the transaction generation process 226 and the BMS element process 228. Now, however, a ledger query process 290 also executes on the processor 216 of the basic distributed device 130. The ledger query process 290 retrieves the transaction information from the ledger (e.g. by querying a remote copy of the ledger over the network 111) and translates the transaction information into instructions and/or other data to be used by the BMS element process 228 in performing the peripheral functions of the building management system 100.

Figure 4:
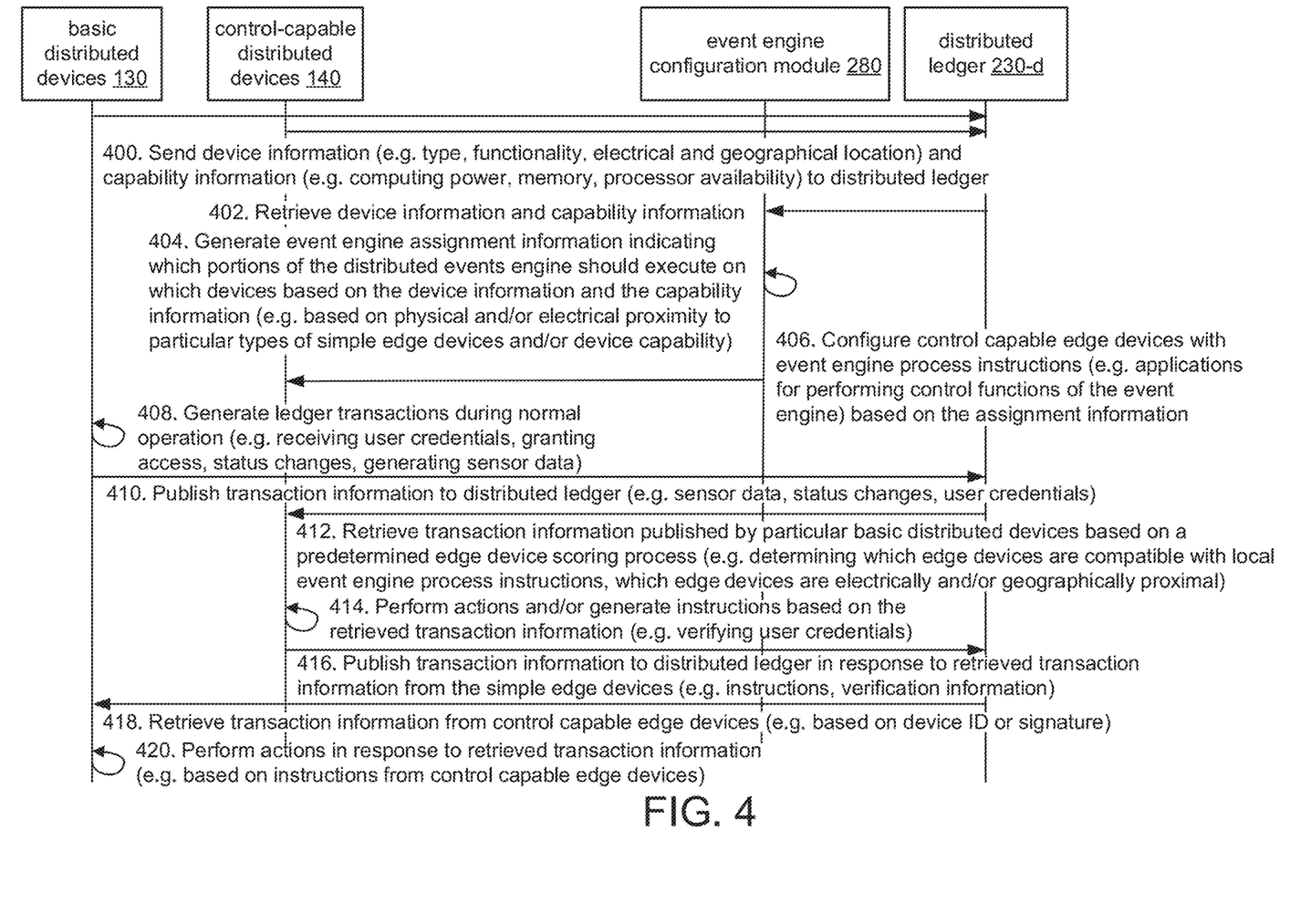
FIG. 4 is a sequence diagram illustrating the process by which a distributed event engine directs functionality of the building management system.

FIG. 4 is a sequence diagram illustrating the process by which the distributed event engine directs the functionality of the building management system 100.

First, in step 400, the distributed devices 130, 140 publish device information and capability information. The device information includes a device type, functionality of the device, and electrical and geographical location information for the device with respect to the other devices. The capability information includes computing power (e.g. of the processor 216), memory capacity (of the nonvolatile memory 218 and/or working memory such as random access memory (RAM)), and availability of the processor 216 to take on additional computing tasks. The information is published to a distributed ledger 230-d as transaction information according to the previously described transaction generation process 226, transaction validation process 220, ledger entry generation process 222, and ledger synchronization process 224. The distributed ledger 230-d is understood to refer collectively to the individual local ledger copies 230 that have been accepted as authoritative (e.g. according to the ledger synchronization process 224).

In step 402, the event engine configuration module 280 retrieves the device information and capability information from the distributed ledger 230-d.

In step 404, the event engine configuration module 280 generates event engine assignment information indicating which portions of the distributed event engine should execute on which control-capable distributed devices 140 based on the device information and the capability information. In one example, the event engine configuration module 280 assigns particular event processes 286 to the control-capable distributed devices 140 based on the physical and/or electrical proximity of the control-capable distributed devices 140 to particular types of basic edge devices 130. In another example, the event engine configuration module 280 assigns particular event processes 286 to the control-capable distributed devices 140 based on whether the device has sufficient processing power and availability to execute the event processes 286.

In step 406, the event engine configuration module 280 configures the control-capable distributed devices 140 with the event engine process instructions (e.g. by downloading and/or installing applications for performing the control functions of the event engine) based on the assignment information.

In one embodiment, the event engine configuration module 280 executes on the control-capable distributed devices 140, and the process of steps 402, 404, and 406 is decentralized, with each of the control-capable distributed devices 140 independently selecting and downloading the event processes 286 based on the device and capability information retrieved from the distributed ledger 230-d.

In another embodiment, the event engine configuration module 280 executes on the control and configuration device 120 of the building management system 100, and the process of steps 402, 404, and 406 is centralized, with the control and configuration device 120 assigning the event processes 286 to the control-capable distributed devices 140 and pushing the event processes 286 down to the devices.

In either case, in step 408, the basic distributed devices 130 generate transaction information during normal operation as the devices perform their respective peripheral building management functions such as receiving identification information from occupants 150, granting access through access points 120, generating sensor data, or generally effecting status changes based on the internal operation of the devices. In step 410, the basic distributed devices 130 publish the transaction information to the distributed ledger 230-d, according to the previously described transaction generation process 226, transaction validation process 220, ledger entry generation process 222, and ledger synchronization process 224.

In step 412, the control-capable distributed devices 140 retrieve from the distributed ledger 230-d the transaction information from a selection of basic distributed devices 130 based on predetermined device scoring criteria evaluated via the edge device scoring process 282. For example, the control-capable distributed device 140 might determine which basic distributed devices 130 are compatible with the event processes 286 of the local event engine 284 and/or determine which basic distributed devices 130 are located electrically and/or geographically near the control-capable distributed device 140 and retrieve the transaction information for only those devices.

In step 414, the control-capable distributed devices 140 perform building management control functions via the event processes 284, for example, by performing actions such as generating instructions for other distributed devices 130, 140 based on the retrieved transaction information. The instructions (or other generated information such as verification information) are published as transaction information to the distributed ledger 230-*d* in step 416.

In step 418, the basic distributed devices 130 retrieve transaction information addressed to the basic distributed devices 130 from the distributed ledger 230-*d* (e.g. by sending a query to a nearby control-capable distributed device 140 with a device ID or signature for the basic distributed device 130 and receiving instructions addressed to the device ID or signature).

In step 420, the basic distributed devices 130 perform the peripheral building management functions based on the retrieved transaction information (e.g. based on instructions from the control-capable distributed devices 140 contained in the transaction information).

As an alternative to steps 416 and 418, the control-capable distributed device 140 could simply send instructions directly to the basic distributed device 130 in parallel with or in lieu of posting the instructions to the distributed ledger 230-*d*.

In one example illustrating steps 412 through 420, a control-capable distributed device 140 such as a smart door reader 140-1 or a surveillance camera 140-2 retrieves identification information associated with an occupant 150 engaging with the door reader 130-2 of a nearby access point 120 from the distributed ledger 230-*d*, verifies the identification information by confirming that the occupant 150 is included on an access control list for the access point 120 stored on the distributed ledger 230-*d*, and generates instructions for the door strike associated with the access point 120 to grant access to the occupant 150 by unlocking the door. These instructions are then published as transaction information to the distributed ledger 230-*d* and retrieved by the door strike, which then proceeds to unlock the door.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of operation of a building management system, the method comprising:
publishing, by distributed devices of the building management system, device and capability information to a distributed transaction ledger, wherein the device and capability information for a given distributed device of the distributed devices includes one or more of electrical or geographical location information of the given distributed device;
configuring the distributed devices with event engine process instructions based on the device and capability information;
determining, by at least one distributed device of the distributed devices and based on the at least one distributed device processing the device and capability information and transaction information published by at least a second distributed device of the distributed devices to the distributed transaction ledger, to control at least the second distributed device, wherein determining to control at least the second distributed device is based on determining, by the at least one distributed device and based on the electrical or geographical location information of at least the second distributed device, that at least the second distributed device is within an electrical or geographical proximity of the at least one distributed device; and
performing, by the at least one distributed device, peripheral functions of the building management system and controlling, by the at least one distributed device, at least the second distributed device based on the event engine process instructions and the transaction information from the distributed transaction ledger.

2. The method as claimed in claim 1, wherein the distributed transaction ledger is a blockchain.

3. The method as claimed in claim 1, wherein the device and capability information includes device type, device functionality, computing power, memory and/or processor availability.

4. The method as claimed in claim 1, further comprising identifying control-capable distributed devices and secondary devices among the distributed devices based on the device and capability information, wherein only the control-capable distributed devices are configured with the event engine process instructions and control the secondary distributed devices.

5. The method as claimed in claim 4, further comprising configuring the control-capable distributed devices with different event engine process instructions based on whether the device and capability information published to the distributed transaction ledger indicates that the control-capable distributed devices have sufficient processing power and availability to execute the event engine process instructions.

6. The method as claimed in claim 1, further comprising configuring, based on geographic proximity information, the distributed devices with the event engine process instructions based on types and functionalities of distributed devices indicated in the device and capability information published to the distributed transaction ledger.

7. The method as claimed in claim 1, further comprising determining, by the at least one distributed device, to control at least the second distributed device based on whether local event engine process instructions executing on the at least one distributed device is compatible with functionalities of at least the second distributed device indicated in the device and capability information published to the distributed transaction ledger.

8. The method as claimed in claim 1, further comprising generating and publishing, by the distributed devices, the transaction information to the distributed transaction ledger during normal operation of the building management system.

9. The method as claimed in claim 1, wherein the transaction information includes status information, sensor data, signal data, and/or instructions for the distributed devices to perform different actions.

10. The method as claimed in claim 1, wherein the device and capability information published by each distributed device includes computing power of a processor of the distributed device, memory capacity of nonvolatile memory and working memory of the distributed device, and availability of the processor of the distributed device to take on additional computing tasks.

11. The method as claimed in claim 1, wherein an edge device scoring process determines which distributed devices are compatible with the event engine process instructions executing on a control-capable distributed device.

12. The method as claimed in claim 1, wherein the at least one distributed device controls at least the second distributed device at least in part by publishing transaction information for at least the second distributed device, including an address of at least the second distributed device, to the distributed ledger.

13. A building management system comprising:
distributed devices for performing peripheral functions of the building management system and publishing device and capability information to a distributed transaction ledger, wherein the device and capability information for a given distributed device of the distributed devices includes one or more of electrical or geographical location information of the given distributed device; and
an event engine configuration module for configuring the distributed devices with event engine process instructions based on the device and capability information,
wherein at least one distributed device of the distributed devices determines, based on processing the device and capability information and transaction information published by at least a second distributed device of the distributed devices to the distributed transaction ledger, to control at least the second distributed device, wherein the at least one distributed device determines to control at least the second distributed device at least in part by determining based on the electrical or geographical location information of at least the second distributed device, that at least the second distributed device is within an electrical or geographical proximity of the at least one distributed device, and
wherein the at least one distributed device controls at least the second distributed device based on the event engine process instructions and the transaction information from the distributed transaction ledger.

14. The system as claimed in claim 13, wherein the distributed transaction ledger is a blockchain.

15. The system as claimed in claim 13, wherein the device and capability information includes device type, device functionality, computing power, memory and/or processor availability.

16. The system as claimed in claim 13, wherein the event engine configuration module identifies control-capable distributed devices and secondary devices among the distributed devices based on the device and capability information, wherein only the control-capable devices are configured with the event engine process instructions and control the secondary distributed devices.

17. The system as claimed in claim 13, wherein the event engine configuration module configures, based on geographic proximity information, the distributed devices with the event engine process instructions based on types and functionalities of distributed devices indicated in the device and capability information published to the distributed transaction ledger.

18. The system as claimed in claim 13, wherein the at least one distributed device determines to control at least the second distributed device based on whether the event engine process instructions executing on the at least one distributed device is compatible with functionalities of at least the second distributed device indicated in the device and capability information published to the distributed transaction ledger.

19. The system as claimed in claim 13, wherein the distributed devices generate and publish the transaction information to the distributed transaction ledger during normal operation of the building management system.

20. The system as claimed in claim 13, wherein the transaction information includes status information, sensor data, signal data, and/or instructions for the distributed devices to perform different actions.

21. A method of operation of a building management system, the method comprising:
publishing, by distributed devices of the building management system, device and capability information to a distributed transaction ledger, wherein the device and capability information published by each distributed device includes computing power of a processor of the distributed device, availability of the processor of the distributed device to take on additional computing tasks and one or more of electrical or geographical location information of the distributed device;
identifying control-capable distributed devices and secondary distributed devices among the distributed devices based on the device and capability information published to the distributed transaction ledger;
configuring the control-capable distributed devices with event engine process instructions executing on the control-capable distributed devices based on whether the device and capability information published to the distributed transaction ledger indicates that the control-capable distributed devices have sufficient processing power and availability to execute the event engine process instructions to particular types of secondary distributed devices as indicated by the device and capability information, wherein each of the control-capable distributed devices independently selects and downloads the event engine process instructions based on the device and capability information;
performing, by the distributed devices, peripheral functions of the building management system and generating and publishing transaction information to the distributed transaction ledger during normal operation of the building management system, wherein the transaction information includes status information, sensor data, signal data, and/or instructions for distributed devices to perform different actions; and
controlling, by the control-capable distributed devices and based on the event engine process instructions and the control-capable distributed devices processing the published transaction information published by the secondary distributed devices to the distributed transaction ledger, the secondary distributed devices, wherein the transaction information, the device information, and the capability information are retrieved, by an edge device scoring process, from a local ledger copy, and wherein the edge device scoring process scores different devices based on a predetermined scoring algorithm including determining whether the different devices are within an electrical or geographical proximity of one another, and determines which transactions from the distributed transaction ledger to be processed by the control-capable distributed devices via event processes of a local event engine.

22. The method of claim 21, wherein the configuring the control-capable distributed devices with the event engine process instructions based on the device and capability information comprises generating event engine assignment information indicating which portions of a distributed event engine for the building management system should execute on which control-capable distributed devices.

23. The method of claim 22, wherein the controlling the secondary distributed devices based on the event engine process instructions and the published transaction information comprises determining, based on a predetermined device scoring process, which transaction information from which secondary distributed devices should be processed by the control-capable distributed devices via locally executing portions of the distributed event engine.

24. The method of claim 23, wherein the predetermined device scoring process includes determining which secondary distributed devices are compatible with locally executing portions of the distributed event engine.

* * * * *